(12) United States Patent
Tajammul et al.

(10) Patent No.: US 11,158,018 B2
(45) Date of Patent: Oct. 26, 2021

(54) FORECASTING SIMULATOR

(71) Applicant: VERIZON PATENT AND LICENSING INC., Basking Ridge, NJ (US)

(72) Inventors: Faiza Tajammul, RSM, CA (US); Jefferson Ray Tan Hidayat, Christchurch (NZ); Hughan Jay Ross, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 230 days.

(21) Appl. No.: 15/837,960

(22) Filed: Dec. 11, 2017

(65) Prior Publication Data

US 2019/0180399 A1 Jun. 13, 2019

(51) Int. Cl.
*G06Q 50/28* (2012.01)
*G06Q 10/06* (2012.01)
*G06Q 10/04* (2012.01)

(52) U.S. Cl.
CPC ............ *G06Q 50/28* (2013.01); *G06Q 10/04* (2013.01); *G06Q 10/067* (2013.01); *G06Q 10/06312* (2013.01); *G06Q 10/06315* (2013.01)

(58) Field of Classification Search
CPC .. G06Q 50/28; G06Q 10/04; G06Q 10/06312; G06Q 10/06315; G06Q 10/067; G06Q 10/00
USPC ........................................................ 705/7.2
See application file for complete search history.

(56) References Cited

U.S. PATENT DOCUMENTS

| | | | | |
|---|---|---|---|---|
| 5,432,887 | A * | 7/1995 | Khaw | G06Q 10/06 706/19 |
| 8,898,291 | B2 * | 11/2014 | Boss | G06F 9/5011 709/224 |
| 2002/0033236 | A1 * | 3/2002 | Aubourg | B21D 53/74 156/556 |

(Continued)

OTHER PUBLICATIONS

Huang Lin Department of Applied Mathematics Dalian University of Technology Dalian City, "Multi-Constrained Routing Based on Tabu Search", 2007 IEEE International Conference on Control and Automation, Guangzhou, China—May 30 to Jun. 1, 2007 (Year : 2007).*

(Continued)

*Primary Examiner* — Rutao Wu
*Assistant Examiner* — Abdallah A El-Hage Hassan

(57) ABSTRACT

A device can receive, from a user device, a request for a simulation of a forecasted change in production of a client organization. The device can obtain scheduling information for a set of historical work orders and a set of existing work orders associated with the client organization. The device can generate a set of simulated work orders using a forecasting technique, information included in the request, and the scheduling information. The device can generate one or more simulated schedules for simulating performance of the set of simulated work orders. The device can determine that one or more capacity values associated with operational resources needed to carry out the set of simulated schedules satisfy one or more threshold capacity values. The device can generate one or more recommendations for improving processes associated with the client organization. The device can provide the one or more recommendations to the user device.

20 Claims, 8 Drawing Sheets

(56) References Cited

U.S. PATENT DOCUMENTS

| | | | | |
|---|---|---|---|---|
| 2002/0174037 | A1* | 11/2002 | Tonouchi | G06Q 10/087 705/28 |
| 2003/0033184 | A1* | 2/2003 | Benbassat | G06Q 30/0202 705/7.14 |
| 2006/0129691 | A1* | 6/2006 | Coffee | H04L 67/04 709/230 |
| 2012/0253880 | A1* | 10/2012 | Kumar | G06Q 10/06 705/7.27 |
| 2013/0041643 | A1* | 2/2013 | Goldstein | G06Q 10/06311 703/6 |
| 2013/0131909 | A1* | 5/2013 | Cooper | B61L 27/0016 701/23 |
| 2014/0278713 | A1* | 9/2014 | Zivelin | G06Q 10/06313 705/7.25 |
| 2016/0217406 | A1* | 7/2016 | Najmi | G06Q 10/06315 |
| 2016/0307145 | A1* | 10/2016 | Banerjee | G06Q 10/063116 |
| 2016/0371642 | A1* | 12/2016 | Wilkinson | G06Q 10/0832 |
| 2017/0178070 | A1* | 6/2017 | Wang | G06Q 10/04 |
| 2018/0101775 | A1* | 4/2018 | Fish | G06Q 10/0631 |
| 2019/0114574 | A1* | 4/2019 | Greenawalt | G06N 20/00 |

OTHER PUBLICATIONS

Heng Wang, Jie Fang, Hua Wang, Ya-Min Sun Department of Computer Science and Technology, Nanjing University of Science and Technology, 608 Staff Room, Nanjing 210094, China "TSDLMRA: an efficient multicast routing algorithm based on Tabu search", Journal of Network and Computer Applications 27 (Year: 2004).*
Lianjun An IBM TJ. Watson Research Center Yorktown, New York 10598, U.S.A. alianjun@us.ibm.com, "Operation-Oriented Design of Decision Support Systems", 978-1-4673-2401-4112 © 2012 IEEE (Year: 2012).*

* cited by examiner

FORECASTING SIMULATOR

BACKGROUND

Forecasting is a process of making predictions based on past data, present data, analysis of trends, and/or the like. For example, an organization can use a forecasting technique to predict a change to supply and/or demand, thereby enabling the organization to take one or more steps to prepare for the change to supply and/or demand.

DETAILED DESCRIPTION OF PREFERRED EMBODIMENTS

Figure 1A:
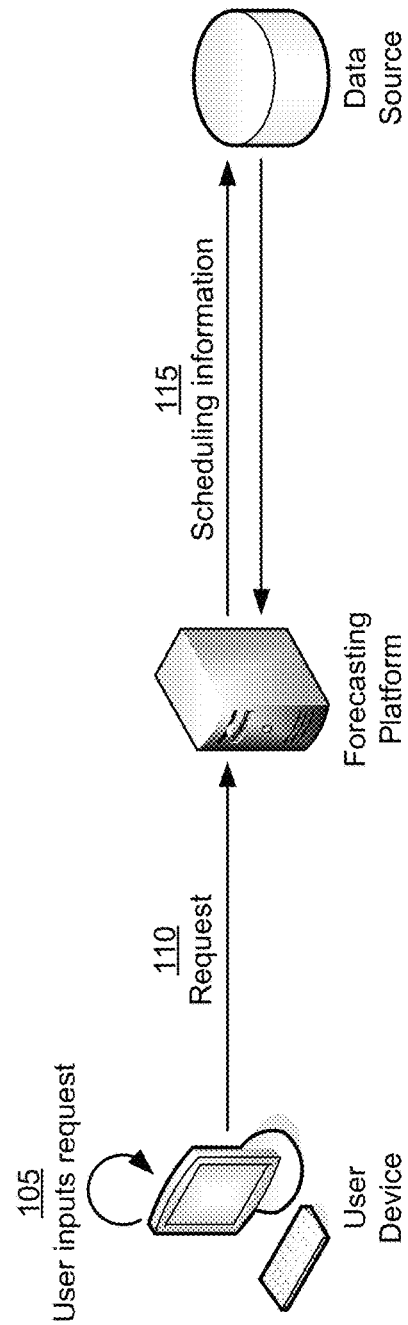
FIGS. 1A-1E are diagrams of an overview of an example implementation described herein.

The following detailed description of example implementations refers to the accompanying drawings. The same reference numbers in different drawings can identify the same or similar elements.

An organization can provide delivery of goods and/or services to particular delivery locations. For example, an organization can utilize a team of drivers and a fleet of vehicles to deliver millions, even billions, of goods and/or services to various delivery locations worldwide. In this case, the organization might need a team of managers to handle logistics for thousands, tens of thousands, hundreds of thousands, or more of deliveries needed to deliver the goods and/or the services.

To prepare for market changes (e.g., an increase in supply or demand, a decrease in supply or demand, etc.), the organization can analyze production trends, and can make generalized forecasts based on the production trends. For example, if production has increased by an average of ten percent for six straight months, a forecast of production for the seventh month might predict another ten percent increase in production.

However, a generalized forecast of growth (or decay) might not adequately prepare the organization for the upcoming change. For example, if production is predicted to increase by ten percent in an upcoming month, the organization might not know the particular locations (e.g., stores) where the increases in production are likely to occur, what particular goods and/or services are causing the spike in production, what operational changes need to be made internally to adequately prepare for the change in production, and/or the like.

Some implementations described herein provide a forecasting platform that generates a set of simulated work orders and a set of simulated schedules that forecast a change in production to enable a client organization to prepare for change. For example, the forecasting platform can receive, from a user device, a request for a simulation of a forecasted change in production of a client organization. Additionally, the forecasting platform can obtain scheduling information associated with the client organization that can be used to perform the simulation.

Furthermore, the forecasting platform can generate a set of simulated work orders using a forecasting technique, information included in the request, and the scheduling information. Additionally, the forecasting platform can generate a set of simulated schedules for simulating performance of the set of simulated work orders. In this case, the forecasting platform can further process the set of simulated schedules to determine whether current operational resources of the client organization are sufficient for performing the set of simulated work orders. Additionally, the forecasting platform can, based on the further processing, generate one or more recommendations associated with improving processes of the client organization, and can provide the one or more recommendations to the user device.

In this way, the forecasting platform is able to identify particular locations where changes in production are likely to occur, operational modifications needed to adequately prepare for the changes in production, and/or the like. By efficiently and effectively forecasting changes to production, the forecasting platform conserves processing resources that might otherwise be used to generate modifications to existing schedules (due to the existing schedule not adequately preparing for changes to production), conserves processing resources that might be used to execute error correction procedures to account for scheduling errors associated with schedules that failed to account for changes to production, and/or the like. Furthermore, the forecasting platform reduces operational costs of the client organization, improves customer satisfaction by maximizing a number of work orders that are performed timely and free of error, and/or the like.

FIGS. 1A-1E are diagrams of an overview of an example implementation 100 described herein. As shown in FIGS. 1A-1E, example implementation 100 provides a forecasting platform that generates a set of simulated work orders and a set of simulated schedules that can be processed to generate recommendations associated with preparing for changes in production.

As shown in FIG. 1A, and by reference number 105, a user can input a request for a simulation of a forecasted change in production of a client organization. For example, the user can interact with a user interface of a user device to input the request.

The request can include projected growth information, work order occurrence information, work order frequency information, location distribution information, and/or the like. The projected growth information can indicate a projected change in a number of work orders (e.g., based on a generalized forecast of production). The work order occurrence information can include a value indicating a percentage of work orders that are projected to be one-time work orders and a value indicating a percentage of work orders that are projected to be reoccurring work orders. The work order frequency information can include one or more values indicating a projected distribution of frequencies for a set of work orders. The location distribution information can include instructions associated with how to select or identify simulated locations (i.e., geographic locations) for the set of simulated work orders. For example, the location distribution information can include an instruction to generate simulated work orders in random locations, an instruction to evenly distribute simulated work orders across a geographic region, generate simulated work orders within a particular zip code or within a geographic area (e.g., an area that can be drawn on a map on a user interface), and/or the like.

As shown as an example, the request can include a 20% projected increase in a number of work orders, a work order occurrence distribution where 40% of work orders are single occurrence work orders and 60% of work orders are reoccurring work orders, a work order frequency distribution where 25% of reoccurring work orders are projected to occur once per week, 50% of reoccurring work orders are projected to occur twice per week, and 25% of reoccurring work orders are projected to occur once per month.

As shown by reference number 110, the user inputting the request can cause the request to be provided to the forecasting platform. As shown by reference number 115, the forecasting platform can obtain, from a data source, scheduling information for a set of historical work orders and for a set of existing work orders (i.e., work orders associated with current customers of the client organization).

The scheduling information can include work order information for the set of historical work orders and the set of existing work orders, vehicle information relating to vehicles used to carry out the set of historical work orders and/or the set of existing work orders, driver information relating to drivers that operate the vehicles used to carry out the set of historical work orders and/or the set of existing work orders, and/or the like. The forecasting platform can use the scheduling information to generate a simulation that realistically reflects the circumstances of the client organization and the expected changes to those circumstances, as described further herein.

In this way, the forecasting platform is able to receive a request for a simulation of a forecasted change in production, and is able to obtain scheduling information that can be used to perform the simulation.

Figure 1B:
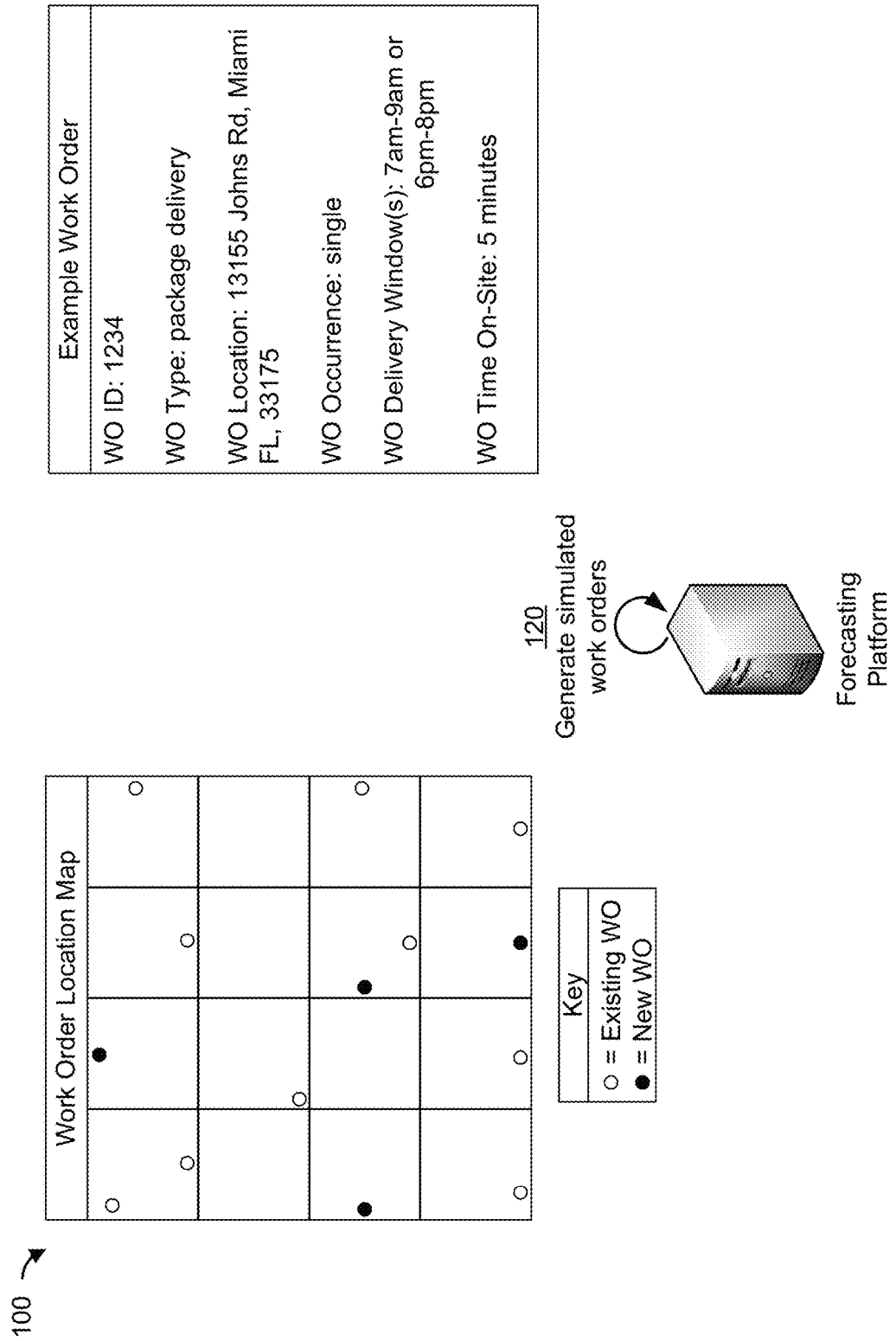

As shown in FIG. 1B, and by reference number 120, the forecasting platform can generate a set of simulated work orders. For example, the forecasting platform can generate a set of simulated work orders that each includes simulated work order information.

The set of simulated work orders can be mock work orders created for the purpose of forecasting changes to production of the client organization. For example, the set of simulated work orders can include one or more simulated work orders that represent a forecasted subset of existing work orders that are projected to be reoccurring work orders and one or more simulated work orders that represent forecasted new work orders. Additionally, each simulated work order can include simulated work order information, such as simulated customer identifier information, simulated work order type information, simulated location information, simulated occurrence information, simulated frequency information, simulated delivery window information, simulated time on site information, and/or the like.

As shown as an example, a simulated work order can include a simulated work order identifier (1234), a simulated work order type (package delivery), a simulated location (13155 Johns Rd., Miami Fla., 33175), a simulated occurrence indicator (single occurrence), one or more simulated delivery windows (7 AM-8 AM or 6 PM-8 PM), a simulated time on site indicator (5 minutes), and/or the like.

In some implementations, the forecasting platform can determine a number of simulated work orders to generate. For example, if the request includes a value projecting a 20% increase in work orders, and the scheduling information includes values indicates that there are 10,000 existing work orders, the forecasting platform can determine that 12,000 simulated work orders need to be generated.

Additionally, the forecasting platform can generate simulated location information for each simulated work order. For example, the forecasting platform can generate simulated location information for the one or more simulated work orders that represent the subset of existing work orders projected to be reoccurring work orders and/or can generate simulated location information for the one or more simulated work orders that represent the forecasted set of new work orders, as described further herein.

As shown, the forecasting platform can generate a work order location map that includes the simulated location information. For example, the work order location map can include the simulated location information for the one or more simulated work orders that represent the subset of existing work orders projected to be reoccurring work orders (shown as white dots). Additionally, the work order location map can include the simulated location information for the one or more simulated work orders that represent the forecasted set of new work orders (shown as black dots).

Referring back to the example described above, the forecasting platform can generate simulated location information for 12,000 simulated work orders, where simulated location information for 10,000 simulated work orders is associated with location information of existing work orders projected as reoccurring work orders, and where simulated location information for 2,000 simulated work orders is associated with location information of new work orders (e.g., locations can be generated using the location distribution information included in the request, as described further herein).

Furthermore, the forecasting platform can generate other types of simulated work order information for each simulated work order, such as the simulated occurrence information, the simulated frequency information, the simulated delivery window information, the simulated time on site information, and/or the like. For example, the forecasting platform can, for each simulated work order, generate simulated occurrence information by randomly assigning simulated work orders as single occurrence or reoccurring, such that the set of simulated work orders have an occurrence distribution percentage equal to or similar to that found in the scheduling information or the occurrence information included in the request by the user device.

As an example, the request includes occurrence information forecasting that 40% of work orders are to be single occurring work orders and 60% of work orders are to be reoccurring work orders, then the forecasting platform can generate simulated occurrence information using the same occurrence distribution. Referring back to the example described above, the forecasting platform can determine that 12,000 simulated work orders need to be generated, where 3,800 of the simulated work orders include simulated occurrence information identifying a single occurring work order, and where 7,200 of the simulated work orders include simulated occurrence information identifying a reoccurring work order.

In this way, the forecasting platform is able to generate a set of simulated work orders for further processing.

Figure 1C:
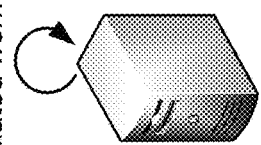

As shown in FIG. 1C, and by reference number 125, the forecasting platform can generate a set of simulated schedules that include a set of simulated routes capable of performing the set of simulated work orders. For example, the forecasting platform can generate a set of simulated schedules that each includes simulated scheduling information identifying a fleet of vehicles and/or a group of drivers that are to use a set of simulated routes for performing the set of simulated work orders.

In this case, the forecasting platform can generate the set of simulated routes using a routing technique, such as a Tabu Search technique, a shortest-path technique (e.g., Dijkstra's algorithm), a solution to the traveling salesman problem (e.g., a heuristic and approximation technique, a constructive heuristics technique, a technique using iterative improvement, etc.), and/or the like. Additionally, the forecasting platform can use the routing technique, simulated location information for the set of simulated work orders, driver information of currently employed drivers, vehicle information for the fleet of vehicles capable of performing simulated work orders, and/or the like, to generate the set of simulated schedules.

As shown as an example, a first existing delivery route can be used to carry out five work orders (shown as 1A to 5A), and a second existing delivery route can be used to carry out four work orders (shown as 1B to 4B). Additionally, the forecasting platform can generate a first simulated route for carrying out the five existing work orders and two simulated new work orders (shown as 1A to 7A), and can generate a second simulated route for carrying out the four existing work orders and two simulated new work orders (shown as 1B to 6B). In practice, the forecasting platform can generate simulated routes for tens of thousands, hundreds of thousands, even millions of routes, for performing millions, even billions, of work orders.

In this way, the forecasting platform is able to generate a set of simulated routes that can be further processed to generate recommendations associated with improving processes of the client organization.

Figure 1D:
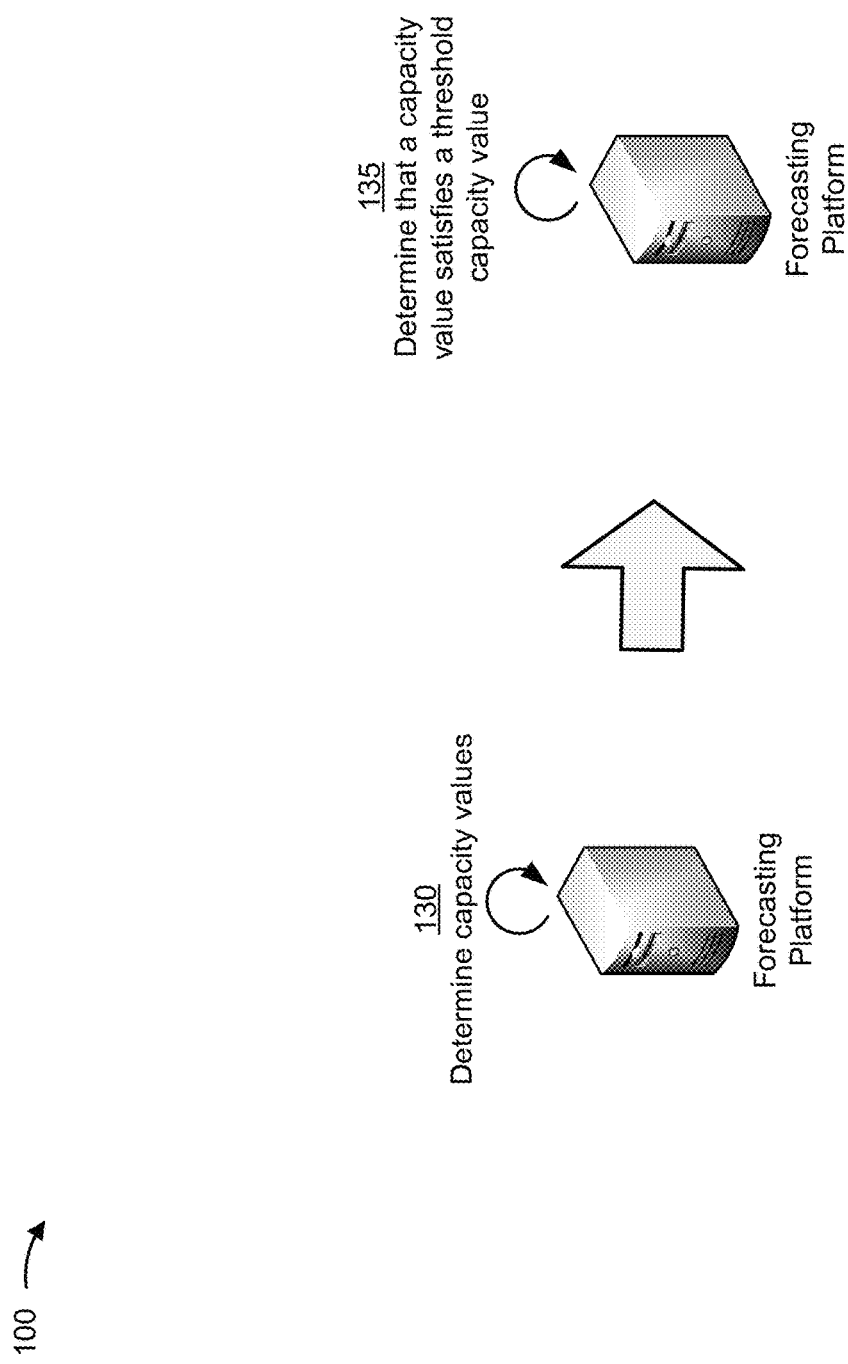

As shown in FIG. 1D, and by reference number 130, the forecasting platform can determine a set of capacity values associated with operational resources needed to carry out the set of simulated schedules. For example, the set of capacity values can include values, statistics, metrics, and/or the like, that can be used to identify an amount or an average amount of operational resources needed to carry out the set of simulated schedules. The set of capacity values can include a capacity value indicating an average number of simulated work orders being assigned to the group of drivers (e.g., overall, in a particular geographic region, etc.), a capacity value indicating a ratio between a total number of vehicles associated with the client organization and a total number of vehicles assigned to carry out the set of simulated work orders, and/or the like.

As shown by reference number 135, the forecasting platform can determine that a capacity value satisfies a threshold capacity value. For example, the forecasting platform can compare the set of capacity values to one or more threshold capacity values to determine whether current operational resources of the client organization are able to efficiently and effectively perform the set of simulated work orders. The one or more threshold capacity values can include a first threshold capacity value associated with a recommended maximum number of simulated work orders to assign to a driver, of the group of drivers, and/or to a vehicle, of the fleet of vehicles, a second threshold capacity value associated with a number (e.g., a total, a ratio, etc.) of vehicles needed to perform the set of simulated work orders, a third threshold capacity value associated with a projected number of simulated work orders that are capable of being performed within scheduled delivery windows, and/or the like.

As an example, the forecasting platform can determine a capacity value indicating that an average of twenty simulated work orders are being assigned to each driver of the group of drivers. Further assume the first threshold capacity value indicates a recommended maximum of fifteen simulated work orders per driver and per vehicle. In this case, the forecasting platform can compare the capacity value to the first threshold capacity value to determine that the threshold capacity value is satisfied.

In this way, the forecasting platform is able to determine that a capacity value satisfies a threshold capacity value, which can cause the forecasting platform to perform one or more actions associated with improving processes of the client organization, as described below.

Figure 1E:
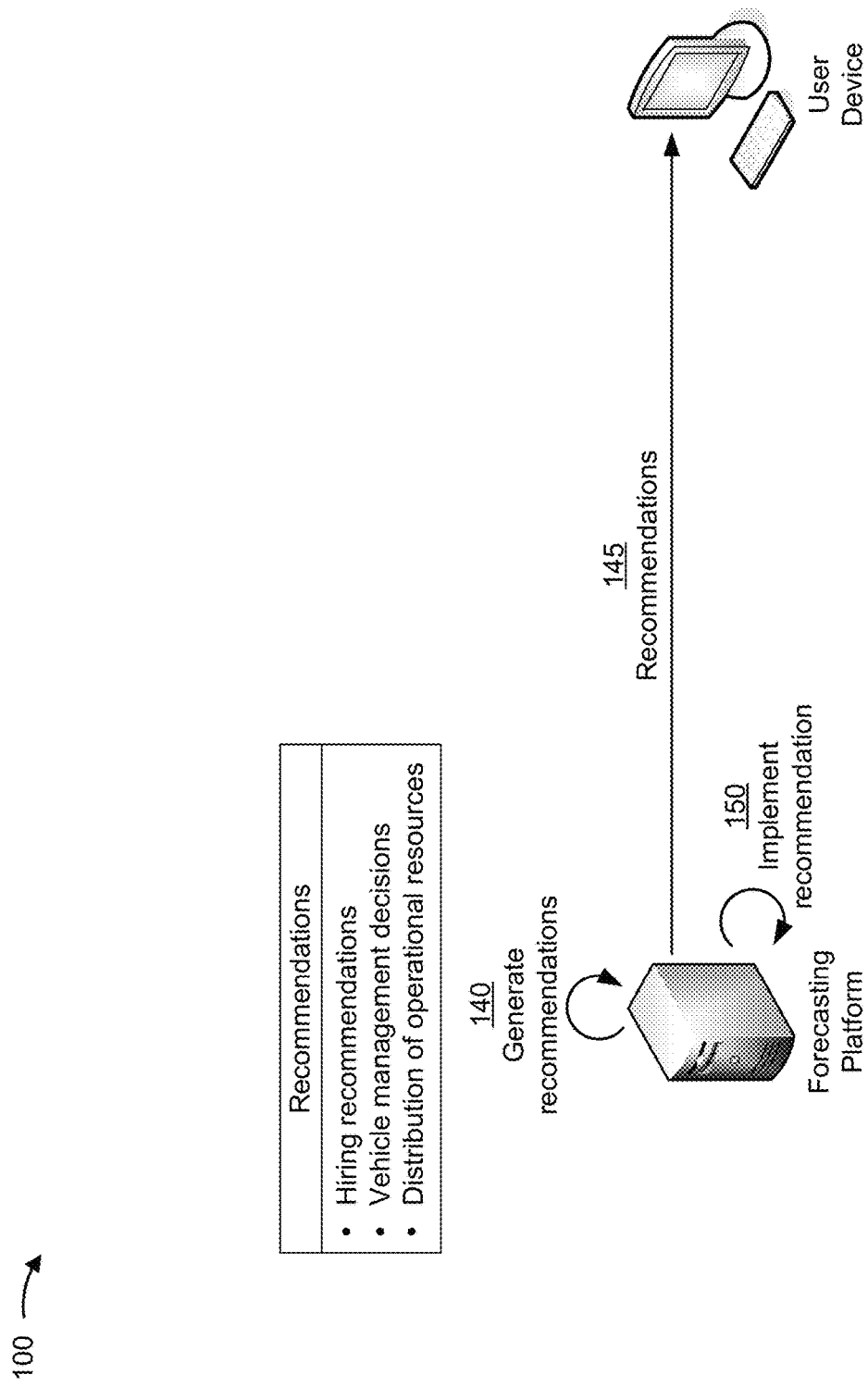

As shown in FIG. 1E, and by reference number 140, the forecasting platform can generate one or more recommendations associated with improving processes of the client organization based on determining that the capacity value satisfies the threshold capacity value. For example, the forecasting platform can generate a recommendation associated with making a hiring decision (e.g., a decision to hire additional drivers, a decision to hire fewer drivers, etc.), a recommendation associated with a vehicle management decision (e.g., to purchase additional vehicles, to purchase fewer vehicles or to sell existing vehicles, etc.), a recommendation to modify a distribution of operational resources (e.g., by moving drivers and/or vehicles from a first geographic location to a second geographic location), and/or the like.

As shown by reference number 145, the forecasting platform can provide the one or more recommendations for display on a user interface of the user device. As shown by reference number 150, the forecasting platform can implementation a recommendation of the one or more recommendations. For example, the forecasting platform can implement the recommendation based on a request from the user device, automatically based on a trigger, and/or the like, as described further herein.

In this way, the forecasting platform is able to identify particular locations where changes in production are likely to occur, operational modifications needed to adequately prepare for the changes in production, and/or the like. Furthermore, the forecasting platform reduces utilization of computing resources by efficiently and effectively forecasting changes to production.

As indicated above, FIGS. 1A-1E are provided merely as an example. Other examples are possible and can differ from what was described with regard to FIGS. 1A-1E. For example, there can be additional devices and/or networks, fewer devices and/or networks, different devices and/or networks, or differently arranged devices and/or networks than those shown in FIGS. 1A-1E. Furthermore, two or more devices shown in FIGS. 1A-1E can be implemented within a single device, or a single device shown in FIGS. 1A-1E can be implemented as multiple, distributed devices. Additionally, or alternatively, a set of devices (e.g., one or more devices) of example environment 100 can perform one or more functions described as being performed by another set of devices of example environment 100.

Figure 2:
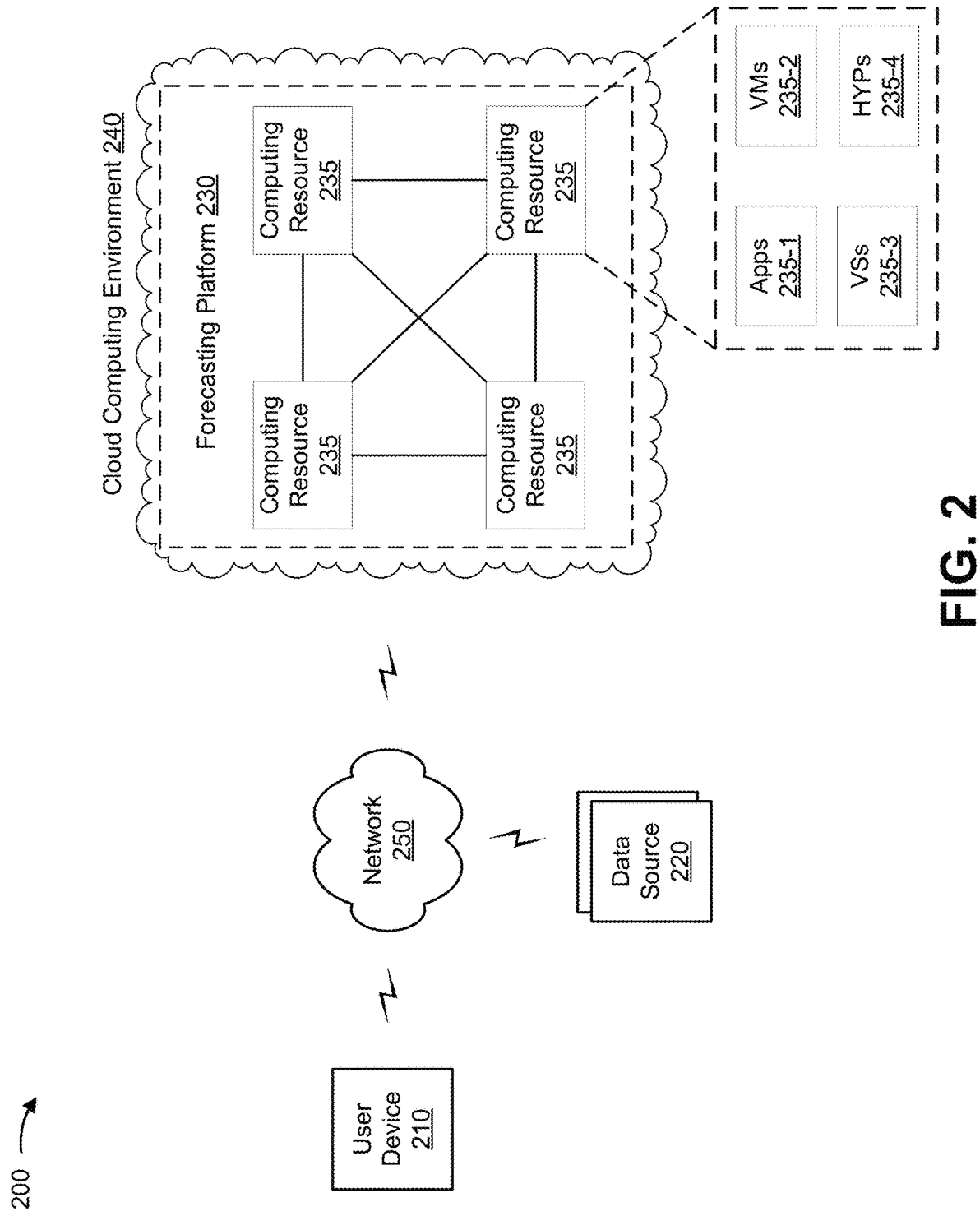
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a data source 220, a forecasting platform 230 hosted by a cloud computing environment 240, and/or a network 250. Devices of environment 200 can interconnect via wired connections, wireless connections, or a combination of connections.

User device 210 includes one or more devices capable of receiving, generating, storing, processing, and/or providing information associated with a simulation of a forecasted change in production. For example, user device 210 can include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), a global positioning system (GPS) device, an electronic control unit (ECU) of a vehicle, an engine control module (ECM) of a vehicle, or a similar type of device. In some implementations, user device 210 can provide a request for simulation of a forecasted change in production to forecasting platform 230. In some implementations, user device 210 can receive one or more recommendations from forecasting platform 230.

Data source 220 includes one or more devices capable of receiving, storing, processing, and/or providing scheduling information and/or simulated scheduling information. For example, data source 220 can include a server device or a group of server devices. In some implementations, data source 220 can receive, from forecasting platform 230, a request for scheduling information. In some implementations, data source 220 can provide the scheduling information to forecasting platform 230.

Forecasting platform 230 includes one or more devices capable of receiving, storing, generating, processing, and/or providing information associated with a simulation of a forecasted change in production. For example, forecasting platform 230 can include a server device (e.g., a host server, a web server, an application server, etc.), a data center device, or a similar device.

In some implementations, as shown, forecasting platform 230 can be hosted in cloud computing environment 240. Notably, while implementations described herein describe forecasting platform 230 as being hosted in cloud computing environment 240, in some implementations, forecasting platform 230 might not be cloud-based (i.e., can be implemented outside of a cloud computing environment) or might be partially cloud-based.

Cloud computing environment 240 includes an environment that hosts forecasting platform 230. Cloud computing environment 240 can provide computation, software, data access, storage, and/or other services that do not require end-user knowledge of a physical location and configuration of system(s) and/or device(s) that host forecasting platform 230. As shown, cloud computing environment 240 can include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 can host forecasting platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by user device 210. Application 235-1 can eliminate a need to install and execute the software applications on user device 210. For example, application 235-1 can include software associated with forecasting platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program, and can support a single process. In some implementations, virtual machine 235-2 can execute on behalf of a user (e.g., user device 210), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
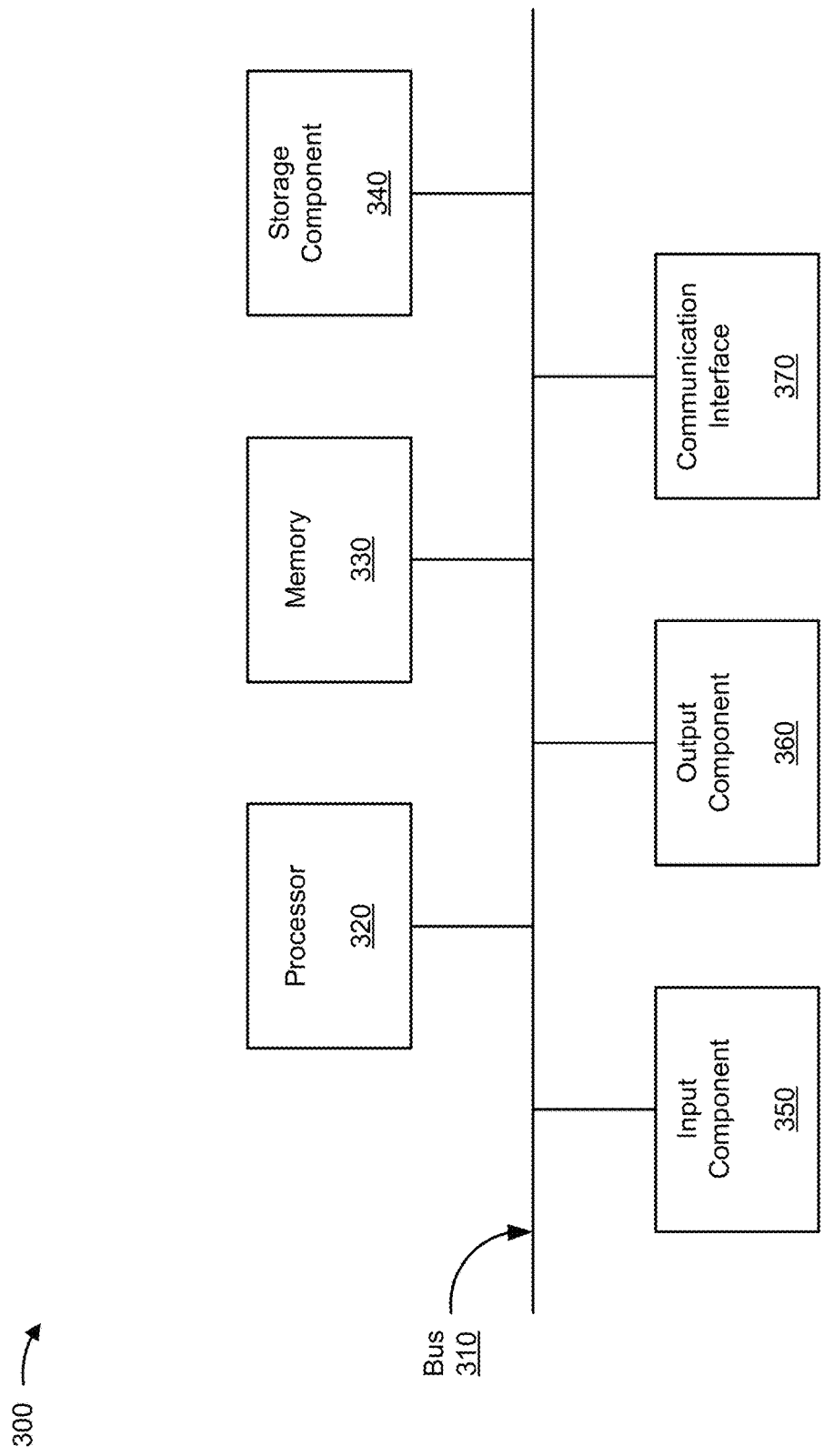
FIG. 3 is a diagram of example components of one or more devices of FIG. 2.

FIG. 3 is a diagram of example components of a device 300. Device 300 can correspond to user device 210, data source 220, and/or forecasting platform 230. In some implementations, user device 210, data source 220, and/or forecasting platform 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in location of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
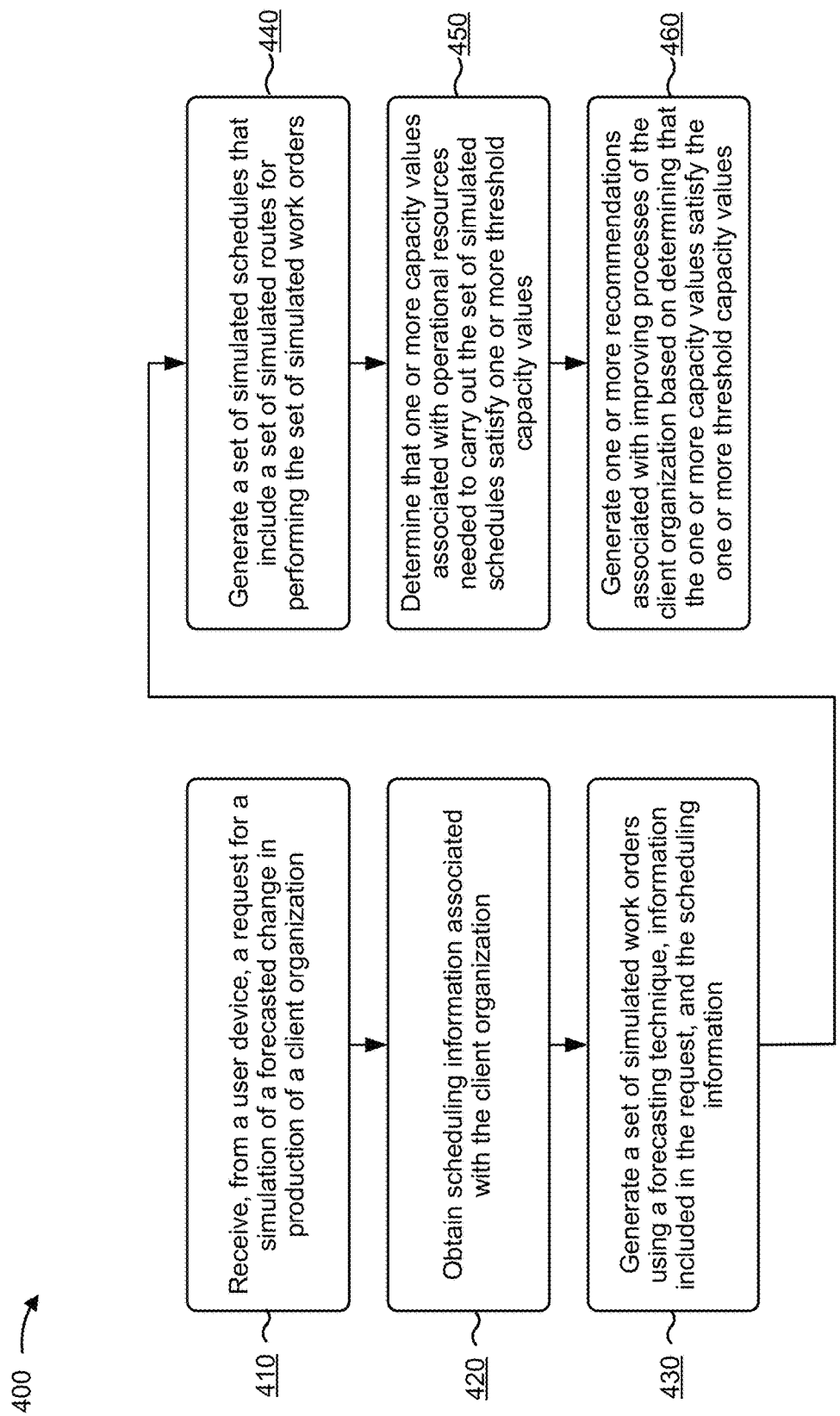
FIG. 4 is a flow chart of an example process for generating a set of simulated work orders and a set of simulated schedules that forecast a change in production to enable a client organization to prepare for the change.

FIG. 4 is a flow chart of an example process 400 for generating a set of simulated work orders and a set of simulated schedules that forecast a change in production to enable a client organization to prepare for the change. In some implementations, one or more process blocks of FIG. 4 can be performed by forecasting platform 230. In some implementations, one or more process blocks of FIG. 4 can be performed by another device or a group of devices separate from or including forecasting platform 230, such as user device 210 and/or data source 220.

As shown in FIG. 4, process 400 can include receiving, from a user device, a request for a simulation of a forecasted change in production of a client organization (block 410). For example, forecasting platform 230 can receive, from user device 210, a request for a simulation of a forecasted change in production of a client organization, such as a forecasted change in a number of work orders. The simulation can be used to generate a set of simulated work orders and a set of simulated schedules that can be further processed to generate recommendations associated with preparing for changes in production of the client organization.

The request can include projected growth information, work order occurrence information, work order frequency information, location distribution information, and/or the like. The projected growth information can indicate a projected change in a number of work orders (e.g., based on a generalized forecast of production). The work order occurrence information can include a value indicating a percentage of work orders that are projected to be one-time work orders and a value indicating a percentage of work orders that are projected to be reoccurring work orders. The work order frequency information can include one or more values indicating a projected distribution of frequencies for a set of work orders. The location distribution information can include an instruction to generate simulated work orders in random locations, an instruction to evenly distribute simulated work orders across a geographic region, generate simulated work orders within a particular zip code or within a geographic area (e.g., an area that can be drawn on a map on a user interface), and/or the like.

In some implementations, a forecasting service can be accessible by user device 210 for providing the request. For example, forecasting platform 230 can support a forecasting service that is able to generate simulations, and the forecasting service can be accessible by user device 210 via a web interface, via a program interface local to user device 210, and/or through a similar type of interface. In this way, user device 210 is able to use the forecasting service to make the request.

In some implementations, rather than receiving a request for a simulation, forecasting platform 230 can automatically simulate the forecasted change in production. For example, forecasting platform 230 can be configured to periodically analyze scheduling information (e.g., work order information, vehicle information, driver information, etc.) over an interval. In this case, forecasting platform 230 can determine actual changes to production (e.g., a percentage amount of growth or decay over the interval), and can use the actual changes to production to make a projection of a forecasted change in the number of work orders. Furthermore, forecasting platform 230 can simulate the forecasted change in production automatically, periodically over an interval, based on a trigger, such as a threshold increase or decrease in the projected change to the number of work orders, and/or the like. In other cases, rather than determine actual changes to production, forecasting platform 230 can use the projected growth information provided by a most recent request made by user device 210 to simulate the forecasted change in production.

In some implementations, forecasting platform 230 can automatically perform a set of simulations using a range of numbers similar to the most recent request provided by user device 210. For example, if user device 210 has provided a projected work order increase between 10% and 15%, forecasting platform 230 can automatically perform a set of separate simulations based on projected work order increases of 10%, 11%, 12%, 13%, 14%, and 15%.

In some implementations, rather than the request including the value indicating the projected change in the number of work orders, the request can permit forecasting platform 230 to determine the projected change in the number of work orders. For example, forecasting platform 230 can determine the value by analyzing the set of historical work orders and/or the set of existing workers. In this case, forecasting platform 230 can analyze the set of historical work orders and/or the set of existing work orders over an interval, and can determine a total change, an average change, a weighted average change, and/or the like (e.g., between work orders or statistics relating to work orders from the start of the interval to the end of the interval), and can use the determined value as the value indicating the projected change in the number of work orders.

In this way, forecasting platform 230 is able to receive a request for a simulation of a forecasted change in production of a client organization.

As further shown in FIG. 4, process 400 can include obtaining scheduling information associated with the client organization (block 420). For example, forecasting platform 230 can obtain, from data source 220, scheduling information for a set of historical work orders and for a set of existing work orders associated with the client organization. The scheduling information can include work order information for the set of historical work orders and the set of existing work orders, vehicle information relating to vehicles used to carry out the set of historical work orders and/or the set of existing work orders, driver information relating to drivers that operate the vehicles used to carry out the set of historical work orders and/or the set of existing work orders, and/or the like.

In some implementations, the scheduling information can include work order information. For example, the work order information can include identification information (e.g., a work order ID, a work order name, etc.), time information (e.g., a work order date), delivery window information, time on site information, location information, frequency information (e.g., a one-time work order, a reoccurring work order etc.), and/or the like.

Additionally, or alternatively, the scheduling information can include driver information. The driver information can include information identifying a driver (e.g., a driver ID, a driver name, etc.), scheduling information indicating previous work orders and/or routes assigned to the driver, driver wages information (e.g., an hourly pay, an overtime rate, etc.), driver credential information including licensing information identifying one or more vehicle types that the driver is licensed to operate, driver preferences information (e.g., a preferred location to work near, a preferred vehicle to operate, a preferred schedule, etc.), and/or the like.

Additionally, or alternatively, the scheduling information can include vehicle information. The vehicle information can include information identifying a vehicle (e.g., a vehicle ID, a vehicle name, etc.), information indicating a vehicle type, vehicle location information (e.g., a vehicle storage location, a current vehicle location, etc.), scheduling information indicating previous work orders and/or routes assigned to the vehicle, additional vehicle information (e.g., a number of kilometers driven by the vehicle, storage dimensions for the vehicle, a size of a gas tank associated with the vehicle, etc.), and/or the like.

In some implementations, forecasting platform 230 can obtain the scheduling information from data source 220. For example, data source 220 can store scheduling information using a data structure, such as an array, a linked-list, a database (e.g., a relational database), a hash table, a tree, a graph, and/or the like. In this case, forecasting platform 230 can reference (e.g., query) data source 220 to obtain the scheduling information. In some implementations, data source 220 can be configured to automatically provide the scheduling information (e.g., periodically throughout an interval) to forecasting platform 230.

In this way, forecasting platform 230 is able to obtain scheduling information that can be used to generate a simulation that realistically reflects the circumstances of the client organization and the expected change to those circumstances.

As further shown in FIG. 4, process 400 can include generating a set of simulated work orders using a forecasting technique, information included in the request, and the scheduling information (block 430). For example, forecasting platform 230 can generate the set of simulated work orders by generating simulated work order information for each simulated work order of the set of simulated work orders.

The set of simulated work orders can be mock work orders created for the purpose of forecasting growth and/or decline in production of the client organization. The set of simulated work orders can include one or more simulated work orders that represent a forecasted subset of existing work orders that are projected to be reoccurring work orders and one or more simulated work orders that represent forecasted new work orders. The simulated work order information can include simulated location information, simulated occurrence information, simulated frequency information, simulated delivery window information, simulated time on site information, and/or the like.

In some implementations, forecasting platform 230 can generate the set of simulated work orders by generating simulated work orders that include simulated values that are proportional to values included in the work order information. For example, forecasting platform 230 can analyze the work order information associated with the set of existing work orders to identify a distribution of occurrence information (e.g., single occurrence, reoccurring, etc.), a distribution of frequency information (e.g., a distribution indicating a frequency of work orders that occur daily, weekly, monthly, etc.), a distribution of time on site information (e.g., 15% of work orders take an average of thirty minutes on-site, 85% of work orders take an average of one hour on-site, etc.), and/or the like.

In some implementations, forecasting platform 230 can determine a number of simulated work orders to generate. For example, forecasting platform 230 can determine a number of simulated work orders to generate based on a number that is provided via the request, based on calculating a number using the forecasted percentage of work order growth provided in the request, or using a similar technique.

In some implementations, forecasting platform 230 can generate simulated location information for each simulated work order. For example, forecasting platform 230 can generate the simulated location information for the one or more simulated work orders that represent the subset of the existing work orders projected to be reoccurring work orders. In this case, forecasting platform 230 can identify location information associated with the subset of the existing work orders projected to be reoccurring work orders as the simulated location information (found in the scheduling information), and can use the identified location information as the simulated location information for the one or more simulated work orders.

Additionally, forecasting platform 230 can generate the simulated location information for the one or more simulated work orders that represent the forecasted set of new work orders. In this case, forecasting platform 230 can identify a geographic region associated with existing work orders (e.g., the client organization might conduct business in only a certain state or country), and can identify all (or some) roads included within the geographic region. Furthermore, forecasting platform 230 can filter out roads that are unlikely to be locations for simulated work orders. For example, forecasting platform 230 can access map information stored by data source 220 to filter out locations of major highways, locations without actual buildings (e.g., open fields), and/or the like. In this case, forecasting platform 230 can use the location distribution information included in the request to determine the simulated location information.

As an example, assume the request by user device 210 includes location distribution information indicating to use random locations when generating the set of simulated work orders, and to generate the set of simulated work orders in a particular geographic region (e.g., a particular zip code, a particular city, etc.). In this case, forecasting platform 230 can calculate a polygon for the particular geographic region. Next, forecasting platform 230 can identify all roads within the polygon, and can filter out roads that are unlikely to include destinations of work orders. Additionally, forecasting platform 230 can simulate combining the roads that were not filtered out, such that a total length of the combined roads can be determined. Here, forecasting platform 230 can generate a uniformly-distributed random number between zero and the total length, and can map the uniformly-distributed random number onto a particular location within a road. Next, forecasting platform 230 can apply an offset to the particular location by identifying road geometry and moving a random distance perpendicular to the road. This process can repeat until the set of simulated work orders has been generated.

In some implementations, forecasting platform 230 can generate other types of simulated work information for each simulated work order. For example, forecasting platform 230 can generate the simulated occurrence information, the simulated frequency information, the simulated delivery window information, the simulated time on site information, and/or the like. In some cases, forecasting platform 230 can generate the other types of simulated work order information using the scheduling information. In other cases, forecasting platform 230 can generate the other types of simulated work order information using information included in the request.

In some implementations, forecasting platform 230 can generate a large volume of simulated work orders. For example, forecasting platform 230 can generate millions, even billions, of simulated work orders that a human would be objectively unable to process.

By generating a complete set of simulated work orders, forecasting platform 230 is able to use the set of simulated work orders to generate simulated routes that can be analyzed to improve efficiency of processes within the client organization, as described further herein.

As further shown in FIG. 4, process 400 can include generating a set of simulated schedules that include a set of simulated routes for performing the set of simulated work orders (block 440). For example, forecasting platform 230 can generate a set of simulated schedules that include simulated scheduling information identifying a fleet of vehicles and/or a team of drivers that are to use a set of simulated routes for performing the set of simulated work orders.

In some implementations, forecasting platform 230 can generate the set of simulated routes using a routing technique. For example, forecasting platform 230 can generate the set of simulated routes such that each simulated work order, of the set of simulated work orders, is a scheduled stop in a simulated route. The routing technique can be a Tabu Search technique, a shortest-path technique (e.g., Dijkstra's algorithm), a solution to the traveling salesman problem (e.g., a heuristic and approximation technique, a constructive heuristics technique, a technique using iterative improvement, etc.), and/or the like.

In some implementations, forecasting platform 230 can assign a driver and a vehicle to a simulated route. For example, forecasting platform 230 can assign a driver and a vehicle to a simulated route by using a scheduling technique to identify optimal drivers and vehicles to assign to particular simulated routes. In this case, the scheduling technique can consider simulated location information for the set of simulated work orders, driver information for the team of drivers, vehicle information for the fleet of vehicles capable of performing the set of simulated work orders, and/or the like.

In some implementations, forecasting platform 230 can generate the set of simulated schedules using lower-level details included in the driver information and/or the vehicle information. For example, forecasting platform 230 can identify that 500 out of 2000 simulated work orders need to be performed by a particular type of vehicle (e.g., a vehicle that carries a larger than normal amount of capacity, such as an over-sized load truck), and can identify that only 10 out of 200 employed drivers are licensed to operate the particular type of vehicle. In this case, forecasting platform 230 can generate simulated routes where the 500 work orders are assigned to the 10 drivers that are licensed to operate the particular type of vehicle needed to perform the work orders. In this way, forecasting platform 230 is able to generate a realistic simulation of operational resources that might be needed to prepare for an increase or a decrease in production.

In some implementations, forecasting platform 230 can perform a number of simulations until a threshold confidence level is satisfied. For example, forecasting platform 230 can continue to generate sets of simulated work orders and can continue to generate sets of simulated schedules until a threshold confidence level is satisfied. The threshold confidence level can be associated with a percentage degree of similarity between real data and simulated data (e.g., between existing work orders and simulated work orders, between historical work orders and simulated work orders, etc.).

By using the driver information and the vehicle information as part of assigning drivers and vehicles to simulated routes, forecasting platform 230 is able to identify the most efficient routes available, thereby reducing operational costs of the client organization (e.g., gas expenditures, hourly wages, etc.). Additionally, forecasting platform 230 conserves processing resources that might otherwise be used to generate inefficient routes and/or modifications to the inefficient routes.

As further shown in FIG. 4, process 400 can include determining that one or more capacity values associated with operational resources needed to carry out the set of simulated schedules satisfy one or more threshold capacity values (block 450). For example, forecasting platform 230 can determine a set of capacity values associated with operational resources needed to carry out the set of simulated schedules, and can compare the set of capacity values to one or more threshold capacity values to determine whether the operational resources are sufficient to perform the set of simulated work orders.

The set of capacity values can include values, statistics, metrics, and/or the like, that can be used to identify an amount or an average amount of operational resources needed to carry out the set of simulated schedules. The set of capacity values can include a capacity value indicating an average number of simulated work orders being assigned to the group of drivers (e.g., overall, in a particular geographic region, etc.), a capacity value indicating a ratio between a total number of vehicles owned by the client organization and a total number of vehicles assigned to carry out the set of simulated work orders, and/or the like.

The one or more threshold capacity values can be used to determine whether the operational resources are sufficient to perform the set of simulated work orders. The one or more threshold capacity values can include a first threshold capacity value associated with a recommended maximum number of simulated work orders to assign to a driver, of the group of drivers, and/or to a vehicle, of the fleet of vehicles, a second threshold capacity value associated with a number (e.g., a total, a ratio, etc.) of vehicles needed to perform the set of simulated work orders, a third threshold capacity value associated with a projected number of simulated work orders that are capable of being performed within scheduled delivery windows, and/or the like.

In some implementations, forecasting platform 230 can determine the set of capacity values. For example, forecasting platform 230 can analyze the scheduling information and/or the simulated scheduling information to determine the set of capacity values. As an example, forecasting platform 230 can analyze the scheduling information and/or the simulated scheduling information to determine a capacity value indicating a ratio between a total number of vehicles owned by the client organization and a total number of vehicles assigned to carry out the set of simulated work orders. The ratio can then be compared to a configurable threshold for measuring whether current operational resources of the client organization are sufficient to perform the set of simulated schedules, as described further herein.

In some implementations, forecasting platform 230 can determine that a capacity value satisfies a threshold capacity value. For example, forecasting platform 230 can compare a capacity value, of the set of capacity values, to a threshold capacity value of the one or more threshold capacity values. If the capacity value satisfies the threshold capacity value, then forecasting platform 230 can generate one or more recommendations associated with improving processes of the client organization, as described further herein.

As an example, forecasting platform 230 can determine a capacity value indicating that an average of twenty simulated work orders are being assigned to each driver of the group of drivers. Further assume the first threshold capacity value associated with recommending a maximum number of simulated work orders to assign to a driver and/or to a vehicle has a value of fifteen simulated work orders per driver and/or per vehicle. In this case, forecasting platform 230 can compare the capacity value to the first threshold capacity value to determine that the threshold capacity value is satisfied.

As another example, forecasting platform 230 can determine that threshold capacity values associated with different geographic regions are satisfied. For example, assume forecasting platform 230 determines a first capacity value that is associated with an average number of drivers assigned to perform simulated work orders in a first geographic region, and that forecasting platform 230 determines a second capacity value that is associated with an average number of drivers assigned to perform simulated work orders in a second geographic region. In this case, forecasting platform 230 can determine that the first capacity value (which might be associated with a high average number of simulated work orders) satisfies a first threshold capacity value, and that a second capacity value (which might be associated with a low average number of simulated work orders) satisfies a second threshold capacity value. In this case, forecasting platform 230 can generate a recommendation to modify operational resources such that operational resources (drivers, vehicles, etc.) can be reassigned from the second geographic region to the first geographic region, as described further herein.

In this way, forecasting platform 230 is able to determine that one or more capacity values associated with operational resources needed to carry out the set of simulated schedules satisfy one or more threshold capacity values.

As further shown in FIG. 4, process 400 can include generating one or more recommendations for improving processes associated with the client organization based on determining that the one or more capacity values satisfy the one or more threshold capacity values (block 460). For example, forecasting platform 230 can generate one or more recommendations, and can provide the one or more recommendations to user device 210. The one or more recommendations can include a recommendation associated with making a hiring decision (e.g., a decision to hire additional drivers, a decision to hire fewer drivers, etc.), a recommendation associated with a vehicle management decision (e.g., to purchase additional vehicles, to purchase fewer vehicles or to sell existing vehicles, etc.), a recommendation to modify a distribution of operational resources (e.g., by moving drivers and/or vehicles from a first location to a second location), and/or the like.

In some implementations, forecasting platform 230 can generate a recommendation associated with making a hiring decision. For example, forecasting platform 230 can generate a recommendation to hire additional drivers if one or more drivers have more than a threshold number of scheduled work orders. In some cases, forecasting platform 230 can generate a recommendation based on the driver credential information (e.g., where a certain type of goods requires drivers to have a particular credential), location information for locations where drivers are needed (e.g., where a certain region is expected to experience growth), and/or the like. Additionally, a recommendation can be generated to hire fewer drivers, in the same manner described above.

Additionally, or alternatively, forecasting platform 230 can generate a recommendation associated with a vehicle management decision, using a similar process to that described above. For example, forecasting platform 230 can generate a recommendation to purchase an additional vehicle if one or more vehicles are assigned a threshold number of simulated work orders. In some cases, forecasting platform 230 can generate a recommendation based on vehicle type information, vehicle location information (e.g., where a certain region is expected to experience growth), and/or the like. Additionally, a recommendation can be generated to sell an existing vehicle, or to purchase less than a previously used amount of vehicles, in the same manner described above. In some cases, forecasting platform 230 can generate a recommendation to purchase or sell an autonomous vehicle, in a similar manner to that described above.

Additionally, or alternatively, forecasting platform 230 can generate a recommendation to modify a distribution of operational resources. For example, forecasting platform 230 can generate a recommendation to reallocate operational resources if a first threshold of operational resources (e.g., associated with a ceiling) is satisfied in one location and a second threshold of operational resources (e.g., associated with a floor) is satisfied in another location. In this case, forecasting platform 230 can generate a recommendation to reassign, to the first geographic region, drivers and vehicles that were previously associated with the second geographic region.

In some implementations, forecasting platform 230 can generate a recommendation using a machine learning model. For example, forecasting platform 230 can provide the one or more simulated schedules as input to a machine learning model that has been trained on one or more schedules (e.g., existing schedules, historical schedules, etc.) and one or more historical actions, which can cause the machine learning model to output a recommendation.

In some implementations, forecasting platform 230 can provide the one or more recommendations to user device 210. For example, forecasting platform 230 can provide the one or more recommendations for display on a user interface of user device 210. In some cases, in addition to provide recommendations for display on the user interface, forecasting platform 230 can generate reports for display on the user interface. The reports can include a work order summary report, a route report, a driver shift report, and/or the like.

In some implementations, forecasting platform 230 can automatically perform one or more steps associated with a hiring recommendation. For example, forecasting platform 230 can automatically generate an advertisement to hire workers, such as upon determining that one or more simulated routes have a number of work orders that exceed the capacity of existing drivers who would be available to make deliveries on the simulated routes. In this case, forecasting platform 230 can identify a set of hiring credentials (e.g., a required amount of driver work experience, required certifications, etc.), and can populate an electronic hiring document that can be displayed over a network, such as the Internet, to allow prospective drivers to see that the organization is hiring. In some cases, the set of hiring credentials may be populated by a human resources manager. In other cases, the set of hiring credentials may be obtained from a data source storing company historical data, or mined from publicly accessible hiring credentials of related organizations.

In some implementations, forecasting platform 230 can automatically perform one or more steps associated with vehicle management decisions. For example, forecasting platform 230 can automatically populate an electronic form to purchase one or more additional vehicles, such as upon determining that one or more simulated routes have a number of work orders that exceeds the capacity of existing vehicles that would be available to make deliveries on the simulated routes, and can automatically send the populated form to a device accessible by a manager of the client organization for review. In some implementations, forecasting platform 230 can automatically perform one or more steps associated with any other recommendation that can be generated.

In this way, forecasting platform 230 is able to generate one or more recommendations associated with improving processes of the client organization.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, forecasting platform 230 is able to identify particular locations where changes in production are likely to occur, operational modifications needed to adequately prepare for the changes in production, and/or the like. By efficiently and effectively forecasting changes to production, forecasting platform 230 conserves processing resources that might otherwise be used to generate modifications to existing schedules (due to the existing schedule not adequately preparing for changes to production), conserves processing resources that might be used to execute error correction procedures to account for scheduling errors associated with schedules that failed to account for changes to production, and/or the like. Furthermore, forecasting platform 230 reduces operational costs of the client organization, improves customer satisfaction by maximizing a number of work orders that are performed timely and free of error, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, configured to:
      receive, via a user interface of a user device, a request for a simulation of a forecasted change in production of a client organization,
         the request including a value indicating a projected change in a number of work orders;
      obtain scheduling information for a set of historical work orders and a set of existing work orders associated with the client organization;
      generate, based on receiving the request, a set of simulated work orders using a forecasting technique, information included in the request, and the scheduling information,
         the set of simulated work orders including one or more simulated work orders that represent a forecasted subset of the set of existing work orders that are projected to be reoccurring work orders, and
         the set of simulated work orders including one or more simulated work orders that represent a forecasted set of new work orders;
      generate, based on receiving the request, one or more simulated schedules for simulating performance of the set of simulated work orders,
         the one or more simulated schedules including simulated scheduling information identifying a fleet of vehicles or a group of drivers that are to use a set of simulated routes for performing the set of simulated work orders,
      where the one or more processors, when generating the one or more simulated schedules, are configured to:
         determine the set of simulated routes using the set of simulated work orders and by iteratively searching and identifying the set of simulated routes for performing the set of simulated work orders, and
      where the one or more processors, when generating the one or more simulated schedules, are configured to:
         generate the one or more simulated schedules based on the set of simulated routes;
      determine, based on generating the one or more simulated schedules, that one or more capacity values, associated with operational resources needed to carry out the one or more simulated schedules, satisfy one or more threshold capacity values;
      provide the one or more simulated schedules as input to a machine learning model that has been trained on one or more historical schedules and one or more historical actions;
      generate, based on providing the one or more simulated schedules as input to the machine learning model, a plurality of recommendations for improving processes associated with the client organization based on determining that the one or more capacity values, associated with the operational resources needed to carry out the one or more simulated schedules, satisfy the one or more threshold capacity values,
         the plurality of recommendations including at least:
            a first recommendation associated with a vehicle management decision, and
            a second recommendation associated with modifying a distribution of the operational resources;
      receive, based on providing the plurality of recommendations to the user device, an instruction from the user device to implement the second recommendation;
      generate, based on the instruction, a new set of schedules to include the distribution of the operational resources that has been modified; and
      deploy the new set of schedules to instruct the fleet of vehicles to perform an updated set of work orders.

2. The device of claim 1, where a simulated work order, of the set of simulated work orders, includes simulated work order information,
   where the simulated work order information includes at least one of:
      simulated geographic location information,
      simulated frequency information,
      simulated occurrence information,
      simulated time on site information, or
      simulated delivery window information.

3. The device of claim 1, where the one or more simulated work orders that represent the forecasted set of new work orders include values that are related to values included in the scheduling information.

4. The device of claim 1, where the one or more processors, when generating the set of simulated work orders, are configured to:
   determine a number of simulated work orders to include in the set of simulated work orders using information included in the request and the scheduling information;
   generate simulated location information for the one or more simulated work orders that represent the forecasted subset of the set of existing work orders that are projected to be reoccurring work orders based on location information included in the scheduling information; and
   generate simulated location information for the one or more simulated work orders that represent the forecasted set of new work orders using location distribution information included in the request,
      the location distribution information including instructions associated with how to select simulated locations for the one or more simulated work orders that represent the forecasted set of new work orders.

5. The device of claim 1,
   where the one or more processors are further configured to:
      assign the fleet of vehicles and/or the group of drivers to the set of simulated routes using the scheduling information and a scheduling technique.

6. The device of claim 1, where the one or more processors, when determining that the one or more capacity values satisfy the one or more threshold capacity values, are configured to:
   analyze the simulated scheduling information to determine a set of capacity values associated with the operational resources needed to carry out the one or more simulated schedules,
      the set of capacity values including the one or more capacity values;
   compare the set of capacity values to the one or more threshold capacity values; and
   determine that a first capacity value, of the set of capacity values, satisfies a threshold capacity value of the one or more threshold capacity values,
      the first capacity value being one of the one or more capacity values.

7. The device of claim 1, where the one or more processors,
   when generating the plurality of recommendations, are configured to:
      generate a third recommendation associated with a hiring decision; and
   where the one or more processors, when providing the plurality of recommendations to the user device, are configured to:
      provide the plurality of recommendations for display on the user interface of the user device.

8. A non-transitory computer-readable medium storing instructions, the instructions comprising:
   one or more instructions that, when executed by one or more processors, cause the one or more processors to:
      receive, via a user interface of a user device, a request for a simulation of a forecasted change in production of a client organization,
         the request including a value indicating a projected change in a number of work orders;
      obtain scheduling information for a set of historical work orders and a set of existing work orders associated with the client organization;
      generate, based on receiving the request, a set of simulated work orders using a forecasting technique, information included in the request, and the scheduling information,
         the set of simulated work orders including one or more simulated work orders that represent a forecasted subset of the set of existing work orders that are projected to be reoccurring work orders, and
         the set of simulated work orders including one or more simulated work orders that represent a forecasted set of new work orders;
      where the one or more instructions, that cause the one or more processors to generate the set of simulated work orders, cause the one or more processors to:
         determine a set of simulated routes using one or more routing techniques and the set of simulated work orders;
      generate, based on receiving the request, one or more simulated schedules for simulating performance of the set of simulated work orders,
         the one or more simulated schedules including simulated scheduling information identifying a fleet of vehicles or a group of drivers that are to use a set of simulated routes for performing the set of simulated work orders;
      determine the set of simulated routes using the set of simulated work orders and by iteratively searching and identifying the set of simulated routes for performing the set of simulated work orders,
      where the one or more instructions, that cause the one or more processors to generate the one or more simulated schedules, cause the one or more processors to:
         generate the one or more simulated schedules based on the set of simulated routes;
      determine, based on generating the one or more simulated schedules, that one or more capacity values, associated with operational resources needed to carry out the one or more simulated schedules, satisfy one or more threshold capacity values;
      provide the one or more simulated schedules as input to a machine learning model that has been trained on one or more historical schedules and one or more historical actions;
      generate, based on providing the one or more simulated schedules as input to the machine learning model, a plurality of recommendations for improving processes associated with the client organization based on determining that the one or more capacity values, associated with the operational resources needed to carry out the one or more simulated schedules, satisfy the one or more threshold capacity values,
         the plurality of recommendations including at least:
            a first recommendation associated with a vehicle management decision, and
            a second recommendation associated with modifying a distribution of the operational resources;
      provide the plurality of recommendations to the user device;
      receive, based on providing the plurality of recommendations to the user device, an instruction from the user device to implement the second recommendation;

generate, based on the instruction, a new set of schedules to include the distribution of the operational resources that has been modified; and
deploy the new set of schedules to instruct the fleet of vehicles to perform an updated set of work orders.

9. The non-transitory computer-readable medium of claim 8, where the one or more simulated work orders that represent the forecasted set of new work orders include values that are proportional to values included in the scheduling information.

10. The non-transitory computer-readable medium of claim 8, where the one or more instructions, that cause the one or more processors to generate the set of simulated work orders, cause the one or more processors to:
generate simulated location information for the one or more simulated work orders that represent the forecasted subset of the set of existing work orders that are projected to be reoccurring work orders based on location information included in the scheduling information, and
generate simulated location information for the one or more simulated work orders that represent the forecasted set of new work orders using location distribution information included in the request,
the location distribution information including:
an instruction to generate the set of simulated work orders in random locations throughout a geographic region, or
an instruction to generate the set of simulated work orders evenly throughout the geographic region.

11. The non-transitory computer-readable medium of claim 8, where the one or more threshold capacity values include at least one of:
a first threshold capacity value associated with a recommended maximum number of simulated work orders to assign to a driver, of the group of drivers, and to a vehicle of the fleet of vehicles,
a second threshold capacity value associated with a total number of vehicles needed to perform the set of simulated work orders, or
a third threshold capacity value associated with a projected number of simulated work orders that are capable of being performed within simulated delivery windows.

12. The non-transitory computer-readable medium of claim 8, where the one or more instructions, that cause the one or more processors to determine that the one or more capacity values associated with operational resources needed to carry out the one or more simulated schedules satisfy the one or more threshold capacity values, cause the one or more processors to:
analyze the simulated scheduling information to determine a set of capacity values associated with the operational resources needed to carry out the one or more simulated schedules,
the set of capacity values including a capacity value indicating an average number of simulated work orders, of the set of simulated work orders, being assigned to the group of drivers;
compare the capacity value indicating the average number of simulated work orders being assigned to the group of drivers to a threshold capacity value of the one or more threshold capacity values;
determine that the capacity value, of the set of capacity values, satisfies the threshold capacity value of the one or more threshold capacity values,
where the capacity value is one of the one or more capacity values; and
where the one or more instructions, that cause the one or more processors to generate the plurality of recommendations, cause the one or more processors to:
generate a third recommendation associated with a hiring decision based on determining that the capacity value, of the set of capacity values, satisfies the threshold capacity value of the one or more threshold capacity values.

13. The non-transitory computer-readable medium of claim 8, where the one or more instructions, that cause the one or more processors to provide the one or more simulated schedules as input to the machine learning model that has been trained on the one or more historical schedules and the one or more historical actions, further cause the machine learning model to output:
a third recommendation associated with a hiring decision.

14. A method, comprising:
receiving, by a device and via a user interface of a user device, a request for a simulation of a forecasted change in production of a client organization,
the request including, a value indicating a projected change in a number of work orders;
obtaining, by the device, scheduling information for a set of historical work orders and a set of existing work orders associated with the client organization;
generating, by the device and based on receiving the request, a set of simulated work orders using a forecasting technique, information included in the request, and the scheduling information,
the set of simulated work orders including one or more simulated work orders that represent a forecasted subset of the set of existing work orders that are projected to be reoccurring work orders, and
the set of simulated work orders including one or more simulated work orders that represent a forecasted set of new work orders;
generating, by the device and based on receiving the request, one or more simulated schedules for simulating performance of the set of simulated work orders,
the one or more simulated schedules including simulated scheduling information identifying a fleet of vehicles or a group of drivers that are to use a set of simulated routes for performing the set of simulated work orders,
where generating the set of simulated work orders comprises:
determining the set of simulated routes using the set of simulated work orders and by iteratively searching and identifying the set of simulated routes for performing the set of simulated work orders, and
where generating the one or more simulated schedules comprises:
generating the one or more simulated schedules based on the set of simulated routes;
determining, by the device and based on generating the one or more simulated schedules, that one or more capacity values, associated with operational resources needed to carry out the one or more simulated schedules, satisfy one or more threshold capacity values;
providing, by the device, the one or more simulated schedules as input to a machine learning model that has been trained on one or more historical schedules and one or more historical actions;
generating, by the device and based on providing the one or more simulated schedules as input to the machine learning model, a plurality of recommendations for improving processes associated with the client organization based on determining that the one or more capacity values, associated with the operational resources needed to carry out the one or more simulated schedules, satisfy the one or more threshold capacity values, the plurality of recommendations including at least:
a first recommendation associated with a vehicle management decision, and
a second recommendation associated with modifying a distribution of the operational resources;

providing, by the device, the plurality of recommendations to the user device;
receiving, by the device and based on providing the plurality of recommendations to the user device, an instruction from the user device to implement the second recommendation;
generating, by the device and based on the instruction, a new set of schedules to include the distribution of the operational resources that has been modified; and
deploying, by the device, the new set of schedules to instruct the fleet of vehicles to perform an updated set of work orders.

15. The method of claim 14, where a simulated work order, of the set of simulated work orders, includes simulated work order information, where the simulated work order information includes at least one of:
simulated geographic location information,
simulated frequency information,
simulated occurrence information,
simulated time on site information, or
simulated delivery window information.

16. The method of claim 14, where generating the set of simulated work orders comprises:
generating the one or more simulated work orders that represent the forecasted subset of the set of existing work orders by generating a first group of values that are proportional to a second group of values included in the scheduling information, and
generating the one or more simulated work orders that represent the forecasted set of new work orders by generating a third group of values that are proportional to a fourth group of values included in the scheduling information.

17. The method of claim 14, where generating the set of simulated work orders comprises:
generating simulated location information for the one or more simulated work orders that represent the forecasted subset of the set of existing work orders that are projected to be reoccurring work orders based on location information included in the scheduling information, and
generating simulated location information for the one or more simulated work orders that represent the forecasted set of new work orders using location distribution information included in the request,
the location distribution information including instructions associated with how to select simulated locations for the one or more simulated work orders that represent the forecasted set of new work orders.

18. The method of claim 14, where determining that the one or more capacity values satisfy the one or more threshold capacity values comprises:
analyzing the simulated scheduling information to determine a set of capacity values,
where the one or more capacity values are included in the set of capacity values,
the set of capacity values including a capacity value indicating a ratio between a total number of vehicles associated with the client organization and a total number of vehicles assigned to carry out the set of simulated work orders;
comparing the set of capacity values to the one or more threshold capacity values; and
determining that the capacity value indicating the ratio satisfies a threshold capacity value of the one or more threshold capacity values; and
where generating the plurality of recommendations comprises:
generating the first recommendation associated with the vehicle management decision based on determining that the capacity value, of the set of capacity values, satisfies the threshold capacity value of the one or more threshold capacity values.

19. The method of claim 14, where determining that the one or more capacity values satisfy the one or more threshold capacity values comprises:
analyzing the simulated scheduling information to determine a set of capacity values,
where the one or more capacity values are included in the set of capacity values,
the set of capacity values including:
a first capacity value indicating an average number of simulated work orders, of the set of simulated work orders, being assigned to a first group of drivers, of the group of drivers, that are associated with a first geographic region, and
a second capacity value indicating an average number of simulated work orders, of the set of simulated work orders, being assigned to a second group of drivers, of the group of drivers, that are associated with a second geographic region;
comparing the first capacity value and the second capacity value to the one or more threshold capacity values;
determining that the first capacity value satisfies a first threshold capacity value associated with a first average number of simulated work orders; and
determining that the second capacity value satisfies a second threshold capacity value associated with a second average number of simulated work orders; and
where generating the plurality of recommendations further comprises:
generating the second recommendation to modify the distribution of the operational resources based on determining that the first capacity value satisfies the first threshold capacity value and based on determining that the second capacity value satisfies the second threshold capacity value.

20. The method of claim 14, further comprising:
automatically populating, based on the first recommendation, an electronic form to purchase one or more additional vehicles; and
automatically sending the electronic form to another device.

* * * * *